(12) United States Patent
Ragusa et al.

(10) Patent No.: US 11,979,411 B2
(45) Date of Patent: May 7, 2024

(54) CONTROL OF ACCESS TO COMPUTING RESOURCES IMPLEMENTED IN ISOLATED ENVIRONMENTS

(71) Applicant: International Business Machines Corporation, Armonk, NY (US)

(72) Inventors: Roberto Ragusa, Rome (IT); Remo Freddi, Ronciglione (IT); Chiara Conti, Rome (IT); Alessandra Asaro, Rome (IT)

(73) Assignee: International Business Machines Corporation, Armonk, NY (US)

( * ) Notice: Subject to any disclaimer, the term of this patent is extended or adjusted under 35 U.S.C. 154(b) by 126 days.

(21) Appl. No.: 17/452,740

(22) Filed: Oct. 28, 2021

(65) Prior Publication Data
US 2023/0135968 A1  May 4, 2023

(51) Int. Cl.
H04L 29/06 (2006.01)
H04L 9/30 (2006.01)
H04L 9/40 (2022.01)

(52) U.S. Cl.
CPC .......... H04L 63/108 (2013.01); H04L 9/3073 (2013.01)

(58) Field of Classification Search
CPC ............................ H04L 63/108; H04L 9/3073
USPC ............................................................ 726/4
See application file for complete search history.

(56) References Cited

U.S. PATENT DOCUMENTS

| 8,977,842 | B1 | 3/2015 | McCorkendale |
| 9,621,540 | B2 * | 4/2017 | Almahallawy ....... H04L 63/062 |
| 9,935,772 | B1 | 4/2018 | Madisetti |
| 10,938,619 | B2 | 3/2021 | Rachamadugu |
| 2014/0130150 | A1 | 5/2014 | Moshchuk |
| 2015/0242253 | A1 * | 8/2015 | Isoyama ............. H04L 41/0686 719/318 |
| 2017/0279806 | A1 | 9/2017 | Marttinen |

(Continued)

FOREIGN PATENT DOCUMENTS

CN        111510444 A       8/2020

OTHER PUBLICATIONS

De Benedictis, Integrity verification of Docker containers for a lightweight cloud environment, Feb. 5, 2019, Future generation computer systems, pp. 1-37 (Year: 2019).*

(Continued)

*Primary Examiner* — Piotr Poltorak
*Assistant Examiner* — Gregory A Lane
(74) *Attorney, Agent, or Firm* — Michael A. Petrocelli

(57) ABSTRACT

A solution is proposed for controlling access to computing resources. A corresponding method comprises receiving and verifying an access request for accessing the computing resources by a secondary computing environment (isolated from the computing resources). A main computing environment (isolated from the secondary computing environment) detects an indication of a positive result of the verification of the access request; in response thereto, the main computing environment verifies an integrity condition of the secondary computing environment and then authorizes the secondary computing environment to access the computing resources accordingly. A computer program and a computer program product for performing the method are also proposed. Moreover, a system for implementing the method is proposed.

16 Claims, 9 Drawing Sheets

(56) References Cited

U.S. PATENT DOCUMENTS

2018/0097817 A1* 4/2018 Aboubakr ............... H04L 63/20
2021/0006548 A1* 1/2021 Zhang ............... H04W 74/0833
2021/0385225 A1* 12/2021 Guionneau ........... H04L 9/3271

OTHER PUBLICATIONS

"Multi-factor authentication", Wikipedia, last edited on May 8, 2021, 12 pages, <https://en.wikipedia.org/wiki/Multi-factor_authentication>.

"Openssh-portable / README.privsep", GitHub, last printed May 10, 2021, 2 pages, <https://github.com/openssh/openssh-portable/blob/master/README.privsep>.

Mell, et al., "The NIST Definition of Cloud Computing", National Institute of Standards and Technology, Special Publication 800-145, Sep. 2011, 7 pages.

De Benedictis et al., "Integrity verification of Docker containers for a lightweight cloud environment", Future Generation Computer Systems, vol. 97, (2019), pp. 236-246.

International Search Report and Written Opinion, International Application No. PCT/EP2022/079557, International Filing Date: Oct. 24, 2022, dated Jan. 30, 2023, 13 pages.

* cited by examiner

CONTROL OF ACCESS TO COMPUTING RESOURCES IMPLEMENTED IN ISOLATED ENVIRONMENTS

BACKGROUND

The background of the present disclosure is hereinafter introduced with the discussion of techniques relating to its context. However, even when this discussion refers to documents, acts, artifacts and the like, it does not suggest or represent that the discussed techniques are part of the prior art or are common general knowledge in the field relevant to the present disclosure.

The present disclosure relates to the information technology field. More specifically, this disclosure relates to the control of access to computing resources.

Controlling access to computing resources is a crucial issue in information technology infrastructures. In fact, most computing resources are to be protected from damages that might be caused thereto, either intentionally or accidentally. For this purpose, access to these protected (computing) resources is restricted, in order to permit/prohibit activities that may be performed on the protected resources (commonly referred to as objects) by different entities, for example, (human) users (commonly referred to as subjects). In this way, it is possible to enable the (right) subjects to perform the (right) activities at right times and for right reasons on the objects; this avoids (or at least significantly reduces) the risk that unauthorized subjects might perform undesired (and generally dangerous) activities in the information technology infrastructure.

SUMMARY

A simplified summary of the present disclosure is herein presented in order to provide a basic understanding thereof; however, the sole purpose of this summary is to introduce some concepts of the disclosure in a simplified form as a prelude to its following more detailed description, and it is not to be interpreted as an identification of its key elements nor as a delineation of its scope.

In general terms, the present disclosure is based on the idea of controlling the access to the computing resources in successive isolated environments.

Particularly, an embodiment provides a method for controlling access to computing resources. A secondary computing environment (isolated from the computing resources) receives and verifies an access request for accessing the computing resources. A main computing environment (isolated from the secondary computing environment) detects an indication of a positive result of the verification of the access request; in response thereto, the main computing environment verifies an integrity condition of the secondary computing environment and then authorizes the secondary computing environment to access the computing resources accordingly.

According to one embodiment, a computer-implemented method for controlling access to one or more computing resources includes, under control of a computing system receiving an access request for accessing the computing resources by a secondary computing environment implemented in the computing system, the secondary computing environment being isolated from the computing resources. The computer verifies the access request by the secondary computing environment. The computer detects an indication of a positive result of verifying the access request by a main computing environment implemented in the computing system, the main computing environment being isolated from the secondary computing environment. The computer verifies an integrity condition of the secondary computing environment by the main computing environment in response to detecting the indication of the positive result. The computer authorizes accessing the computing resources to the secondary computing environment by the main computing environment in response to a positive result of verifying the integrity condition.

A further aspect provides a computer program for implementing the method.

A further aspect provides a corresponding computer program product.

A further aspect provides a corresponding system.

More specifically, one or more aspects of the present disclosure are set out in the independent claims and advantageous features thereof are set out in the dependent claims, with the wording of all the claims that is herein incorporated verbatim by reference (with any advantageous feature provided with reference to any specific aspect that applies mutatis mutandis to every other aspect).

The control of the access to the protected resources is implemented by corresponding access control applications. In general, each access control application associates the subjects with digital identities used to identify the subjects for operating in the information technology infrastructure. The access control application authenticates each subject attempting to access the protected resources to confirm the identity thereof by means of credentials that should be possessed only by the subject to prove his/her identity (such as a private key stored in a secure way on a client of a user, corresponding to a public key comprised in a list of authorized users available to the access control application). To improve security, a multi-factor authentication may also be implemented. In this case, the access control application requires two or more pieces of information (factors) that should be possessed only by the subject attempting to access the protected resources for confirming his/her identity; a typical example is a (randomly generated) One-Time Password (OTP) that is sent to the subject via another communication channel (such as to a mobile phone thereof) or is provided by a security token.

A typical example is the access to a host from clients over an unsecure network (such as the Internet), for example, to log into the host remotely. For example, the Secure Shell Protocol (SSH) may be used to establish a secure channel (for transferring data resistant to both overhearing and tampering) between an SSH client running on the client of each user authorized to access the host (such as operators of a corresponding organizations) and an SSH server running on the host.

However, the access control application may have vulnerabilities that do not allow it to withstand the effects of hostile attacks. This exposes the protected resources to threats, due to the possibility that damages (having negative effects on the information technology infrastructure) might take place because of the vulnerabilities. Particularly, malicious code (exploit) may be used by an attacker to hack the access control application exploiting its vulnerabilities. For example, the access control application may be hijacked (to cause it to send data to the attacker) by means of malformed or overflowing contents; in this way, the attacker taking control of the access control application (running with high privileges for creating sessions to access the protected resources), might operate with high privileges as well. To limit the impact of possible attacks, a privilege separation technique may be implemented. In this case, the access control application is divided into two processes with different privileges. A child unprivileged process handles communication with the subjects and a parent privileged process handles authentication of the subjects, with the two processes that communicate between them via a well-defined interface.

New vulnerabilities of the access control application are continuously discovered (for example, by means of automatic tools or reverse-engineering). Therefore, the access control application is upgraded over time to fix the known vulnerabilities (for example, by distributing patches or new releases/versions).

However, in some cases it might be difficult, if not impossible, to have the latest level of the access control application promptly installed. For example, the upgrade of the access control application is quite complex when a corresponding computing system is deployed as a software image (a structure that encapsulates the content of a mass memory of the computing system) or as a virtual appliance (a structure encapsulating the definition of one or more virtual machines with their software images), as typical of cloud environments. Moreover, the upgrade of the access control application is prevented when it requires a more recent level of one or more other software programs running on the corresponding computing system.

BRIEF DESCRIPTION OF THE SEVERAL VIEWS OF THE DRAWINGS

The solution of the present disclosure, as well as further features and the advantages thereof, will be best understood with reference to the following detailed description thereof, given purely by way of a non-restrictive indication, to be read in conjunction with the accompanying drawings (wherein, for the sake of simplicity, corresponding elements are denoted with equal or similar references and their explanation is not repeated, and the name of each entity is generally used to denote both its type and its attributes, like value, content and representation).

The drawings are set forth as below as.

DETAILED DESCRIPTION

With reference in particular to FIG. 1A-FIG. 1D, the general principles are shown of the solution according to an embodiment of the present disclosure.

Figure 1A:
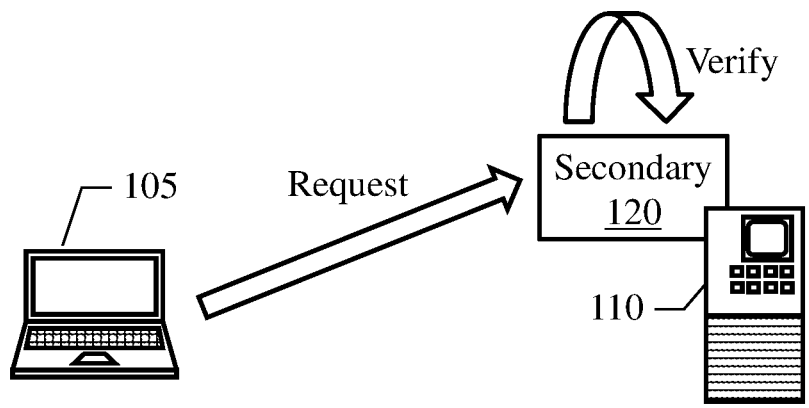
FIG. 1A shows the general principles of the solution according to an embodiment of the present disclosure.

Starting from FIG. 1A, a user of a client computing machine, or simply client 105 needs to access one or more protected (computing) resources, for example, implemented on a host computing system, or simply host 110. For this purpose, the client 105 submits a corresponding access request (for accessing the computing resources). In the solution according to an embodiment of the present disclosure (as described in detail in the following), the access to the protected resources is controlled with a twofold procedure, under the control in succession of a secondary (computing) environment 120 and a main (computing) environment 130 that are implemented on a computing system (for example, the same host 110). For this purpose, the access request is received by the secondary environment 120. The secondary environment 120 is isolated from the protected resources (for example, implemented by a container running on the host 110). The secondary environment 120 verifies the access request as usual (for example, by authenticating the user via corresponding credentials).

Figure 1B:
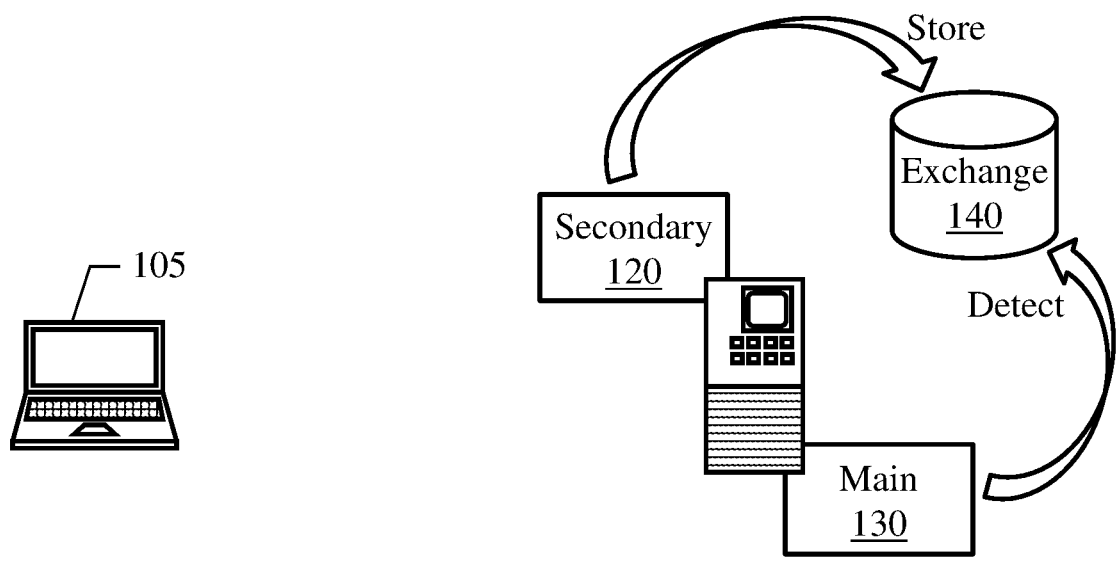
FIG. 1B shows the general principles of the solution according to an embodiment of the present disclosure.

Moving to FIG. 1B, the situation is considered wherein a result of the verification of the access request is positive (for example, when the user has been correctly authenticated). In the solution according to an embodiment of the present disclosure, the main environment 130 detects the positive result of the verification of the access request (carried out by the secondary environment 120). For example, in an implementation the secondary environment 120 stores a result indicator (such as a public key being freshly generated for the user) into an exchange memory area 140 (such as a user directory of the container). The main environment 130 monitors the exchange memory area 140 to detect the storing of the public key, and then indirectly the positive result of the verification.

Figure 1C:
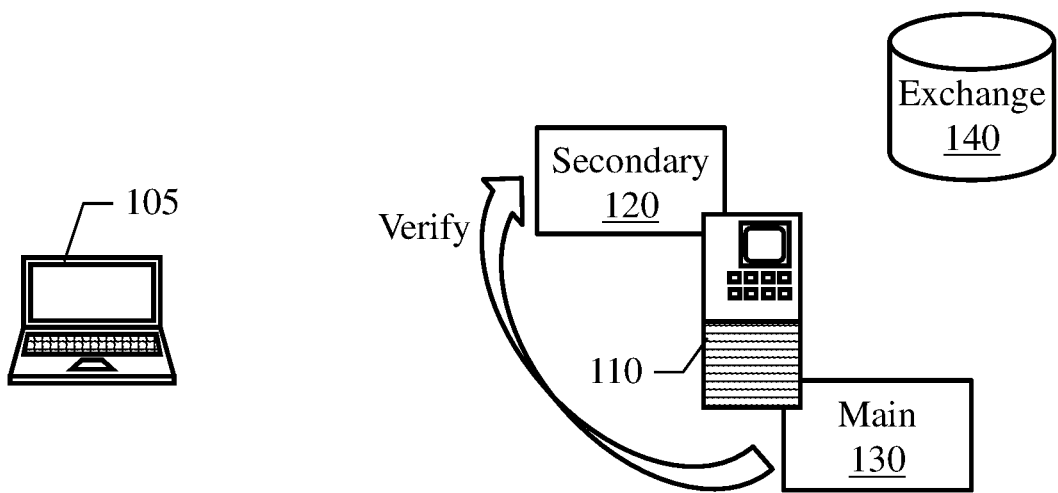
FIG. 1C shows the general principles of the solution according to an embodiment of the present disclosure.

Moving to FIG. 1C, in response to the detection of the positive result of the verification (of the access request by the secondary environment 120), the main environment 130 verifies an integrity condition of the secondary environment. For example, the main environment 130 verifies whether the public key is formally correct and timely generated, whether processes and content of the secondary environment 120 are as expected, and so on.

Figure 1D:
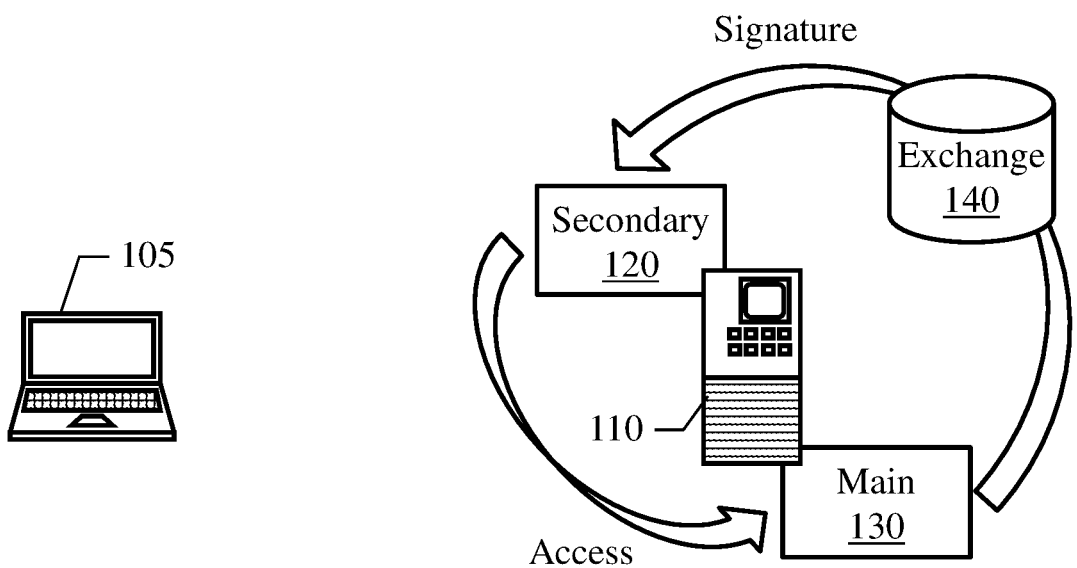
FIG. 1D shows the general principles of the solution according to an embodiment of the present disclosure.

Moving to FIG. 1D, in case of a positive result of the verification of the integrity condition of the secondary environment 120, the main environment 130 authorizes the access to the protected resources to the secondary environment 120. For example, the main environment 130 digitally signs the public key and stores its signature into the exchange memory area 140; as soon the secondary environment 120 detects the storing of the signature of the public key, it submits a (further) access request for the protected resources (on behalf of the user) to the main environment 130, by using the signature of the public key as credentials (which are automatically accepted by the main environment).

In this way, the authentication of the user is performed entirely within the secondary environment 120, which acts as a checkpoint only performing this task. Therefore, any attackers that might be able to hack the secondary environment 120 would at most obtain access only to it (completely isolated from the protected resources). Moreover, the main environment 130 is not exposed to the attackers, since it may receive access requests only from the secondary environment 120 (on behalf of users that have already been successfully authenticated).

In any case, the main environment 130 (not reachable from outside) verifies the integrity condition of the secondary environment 120 without being exposed thereto. This prevents the attackers from taking advantage of any vulnerabilities of the secondary environment 120. In fact, as soon as the main environment 130 suspects that the secondary environment 120 has been hacked, it refuses any access requests coming therefrom. This makes it very difficult for the attackers to obtain access to the protected resources even if they manage to take over control of the secondary environment 120.

Any access control application running on the secondary environment 120 for controlling the access to the protected resources may always be installed at its latest level, since it is completely independent of the rest of the corresponding computing system. This ensures that the access control application is upgraded to fix all the known vulnerabilities. All of the above ensures high protection against possible attacks in every situation; for example, the latest level of the access control application may be readily installed even when the corresponding computing system is deployed as a software image or as a virtual appliance (especially useful in cloud environments), and irrespectively of any compatibility problems with the other software programs of the computing system.

Figure 2:
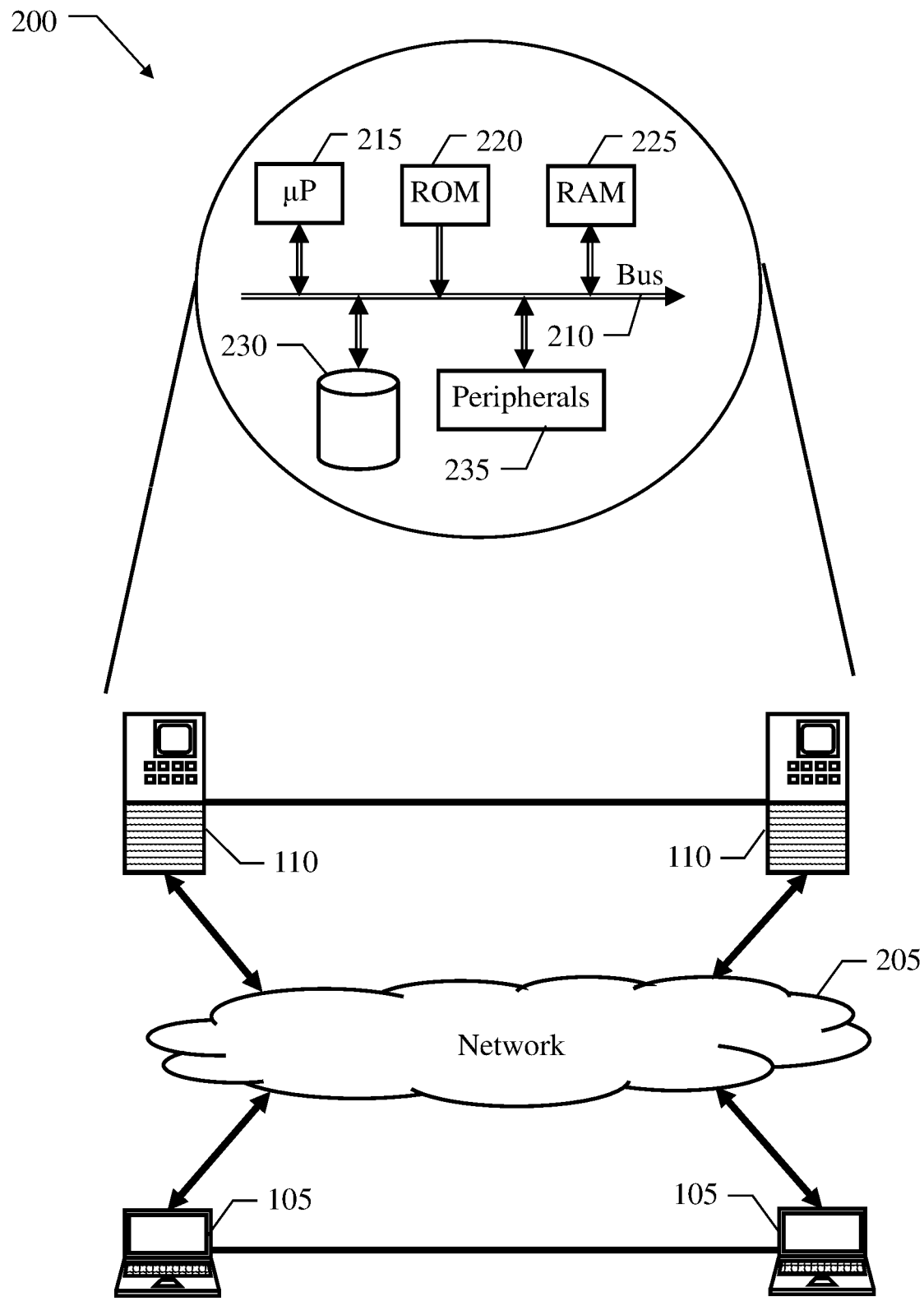
FIG. 2 shows a schematic block diagram of an information technology infrastructure wherein the solution according to an embodiment of the present disclosure may be practiced.

With reference now to FIG. 2, a schematic block diagram is shown of an information technology infrastructure 200 wherein the solution according to an embodiment of the present disclosure may be practiced.

The information technology infrastructure 200 comprises multiple instances of the above-mentioned client 105 and one or more instances of the above-mentioned host 110. The information technology infrastructure 200 has a distributed architecture, with the clients 105 and the hosts 110 that communicate among them over a (telecommunication) network 205. Access to the network 205 is allowed to more users than the ones authorized to access the hosts 110; for example, the network 205 is unsecure (such as of global type based on the Internet), so that access thereto is not controlled. In a specific implementation, the information technology infrastructure 200 is based on a client/server model, wherein the hosts 110 operate as servers providing services to the clients 105.

At least part of the hosts 110 provide the protected resources. Particularly, these are hardware and/or software resources (for example, devices, machines, files, programs, web pages and so on) that may be accessed only by (authorized) users of the clients 105 (either directly on the hosts 110 or via services offered by them, such as CRM, LDAP, STEM, SaaS, e-mail and so on). One or more of the hosts 110 control the access to the protected resources (for example, to use devices, start/stop machines, read/write files, run programs, download contents and so on). The protected resources controlled by each host 110 may be provided either by the same host 110 or by a pool of one or more other hosts 110; in the latter case, the hosts 110 of the pool communicate with the host 100 controlling their protected resources over a secure (communication) network, such as a dedicated LAN (not shown in the figure).

Each one of the above-described computing machines (i.e., clients 105 and hosts 110) comprises several units that are connected among them through a bus structure 210 at one or more levels (with an architecture that is suitably scaled according to the type of the computing machine 105,110). Particularly, a microprocessor (μP) 215, or more, provides a logic capability of the computing machine 105, 110; a non-volatile memory (ROM) 220 stores basic code for a bootstrap of the computing machine 105,110 and a volatile memory (RAM) 225 is used as a working memory by the microprocessor 215. The computing machine 105,110 is provided with a mass-memory 230 for storing programs and data (for example, corresponding SSDs for the clients 105 and storage devices of a data center, or more, wherein they are implemented for the hosts 110). Moreover, the computing machine 105,110 comprises a number of controllers for peripherals, or Input/Output (I/O) units, 235; for example, the peripherals 235 of each client 105 comprise a keyboard, a mouse, a monitor, a network adapter for connecting to the network 205 and a drive for reading/writing removable storage units (such as of USB type), whereas the peripherals 235 of each host 110 comprise a network adapter for plugging the host 110 into the respective data center and then connecting it to a console of the data center for its control (for example, a personal computer, also provided with a drive for reading/writing removable storage units, such as of USB type) and to a switch/router sub-system of the data center for its communication with the network 205.

Figure 3:
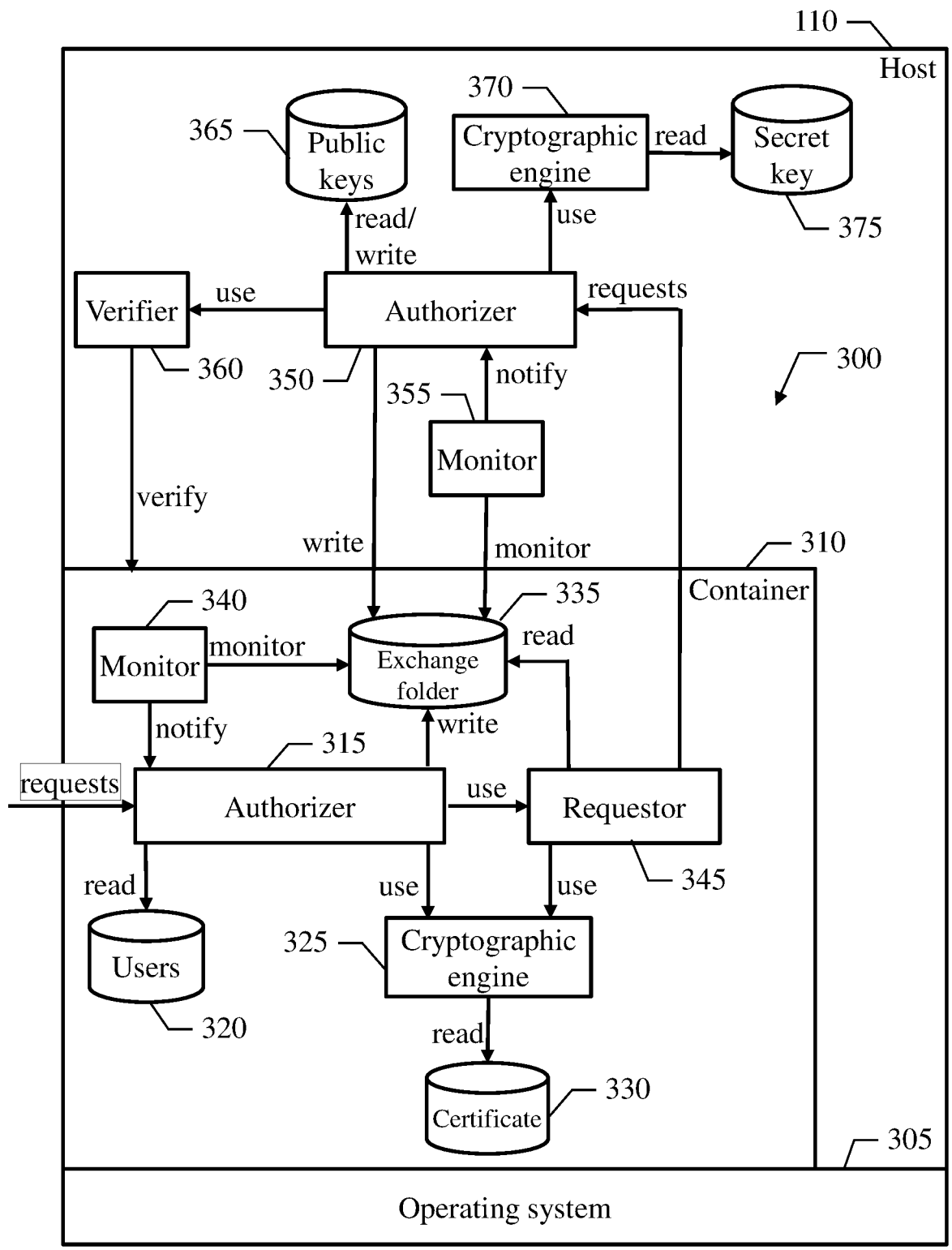
FIG. 3 shows the main software components that may be used to implement the solution according to an embodiment of the present disclosure.

With reference now to FIG. 3, the main software components are shown that may be used to implement the solution according to an embodiment of the present disclosure.

Particularly, all the software components (programs and data) are denoted as a whole with the reference 300. The software components 300 are typically stored in the mass memory and loaded (at least partially) into the working memory of a generic host 110, which controls the access to corresponding protected resources (provided by either the same host 110 or a pool of other hosts, not shown in the figure) when the programs are running, together with possible other application programs not directly relevant to the solution of the present disclosure (thus omitted in the figure for the sake of simplicity). The programs are initially installed into the mass memory, for example, from removable storage units or from the network. In this respect, each program may be a module, segment or portion of code, which comprises one or more executable instructions for implementing the specified logical function.

An operating system 305 running directly on the hardware of the host 110 defines a software platform on top of which any other software programs may run. Particularly, a container 310 (also known as zone, private host or partition) emulates a computing environment running on the (shared) operating system 305 (exploiting resource isolation features provided by it). The computing environment of the container 310 is isolated from the rest of the host 110, since it runs in a segregated working memory area (user space) and it is allocated selected resources of the host 110 that are assigned thereto (such as file system, devices, network connections, processing power and so on). As a result, the container 310 is completely isolated from the protected resources whose access has to be controlled. The container 310 defines the above-mentioned secondary environment 120. The rest of the host 110 implemented by the operating system 305 (with the exception of the container 310) instead defines the main environment 130 (completely isolated from the container 310).

The container 310 comprises the following components. A (secondary) authorizer 315 exposes an interface outside the host 110 for receiving corresponding access requests for accessing the protected resources from the users of the clients (not shown in the figure). The authorizer 315 verifies the access requests to (preliminary) authorize or refuse them. For example, the authorizer is an SSH server (exposing an SSH deamon) that implements the Secure Shell (SSH) protocol for controlling access to the protected resources in a secure way over the (unsecure) network (not shown in the figure), in response to access requests submitted by the clients of the users via SSH clients running thereon. The authorizer 315 reads a user repository 320, which contains information about the users authorized to access the protected resources. For example, the user repository 320 has an entry for each (authorized) user; the entry stores identification information of the user and a corresponding public key (the corresponding private key being stored in the client of the user protected by a secret password thereof). The authorizer 315 uses a (secondary) cryptographic engine 325, which performs encryption and decryption operations. The cryptographic engine 325 reads a digital certificate 330 of the host 110. The authorizer 315 writes an exchange folder 335, which implements the above-mentioned exchange memory area. The exchange folder 335 stores information relating to the (active) access requests. For example, the exchange folder 335 contains a directory for each access request, which directory is used to store a pair of private/public keys by the container (defining the above-mentioned result indicator of the positive result of the verification of the access request) and a signature of the public key by the host (to be used a credentials for authenticating the container with it). A (secondary) monitor 340 monitors the exchange folder 335 and it notifies the authorizer 315 of any changes thereof. The authorizer 315 uses a requestor 345. The requestor 345 submits corresponding (further) access requests for (actually) accessing the protected resources (to the same host 110 or to the other hosts of the pool, not shown in the figure). In the example at issue, the requestor 345 is implemented by an SSH client.

The host 110 comprises the following components (in addition to the container 310). A (main) authorizer 350 (actually) authorizes or refuses the requests to access the protected resources. For example, as above the authorizer 350 is an SSH server implementing the SSH protocol. When the protected resources are the host 110, the authorizer 350 further exposes an interface (an SSH deamon in the example at issue) to the container 310, i.e., to its requestor 345, for receiving corresponding (further) access requests for accessing the protected resources on behalf of the users. A (main) monitor 355 monitors the exchange folder 335 and it notifies the authorizer 350 of any changes thereof. The authorizer 350 writes the exchange folder 335. The above-mentioned read/write operations are possible since the exchange folder 335 of the container 310 is fully accessible to the host 110 (via the operating system 305 implementing the container 310). The authorizer 355 uses a verifier 360. The verifier 360 verifies an integrity condition of the container 310. For example, the integrity condition is defined by the data that are written into the exchange folder 335, a content of container 310 (such as information stored in its memory space) and/or an operation of the container 310 (such as its running processes). The authorizer 355 reads/writes a public keys repository 365, which stores the public keys for authenticating the access request received from the container 310. The authorizer 355 uses a (main) cryptographic engine 370, which performs encryption and decryption operations. The cryptographic engine 370 reads a secret key 375 of the host 110 (such as a private key thereof) being stored in a secure way.

Figure 4A:
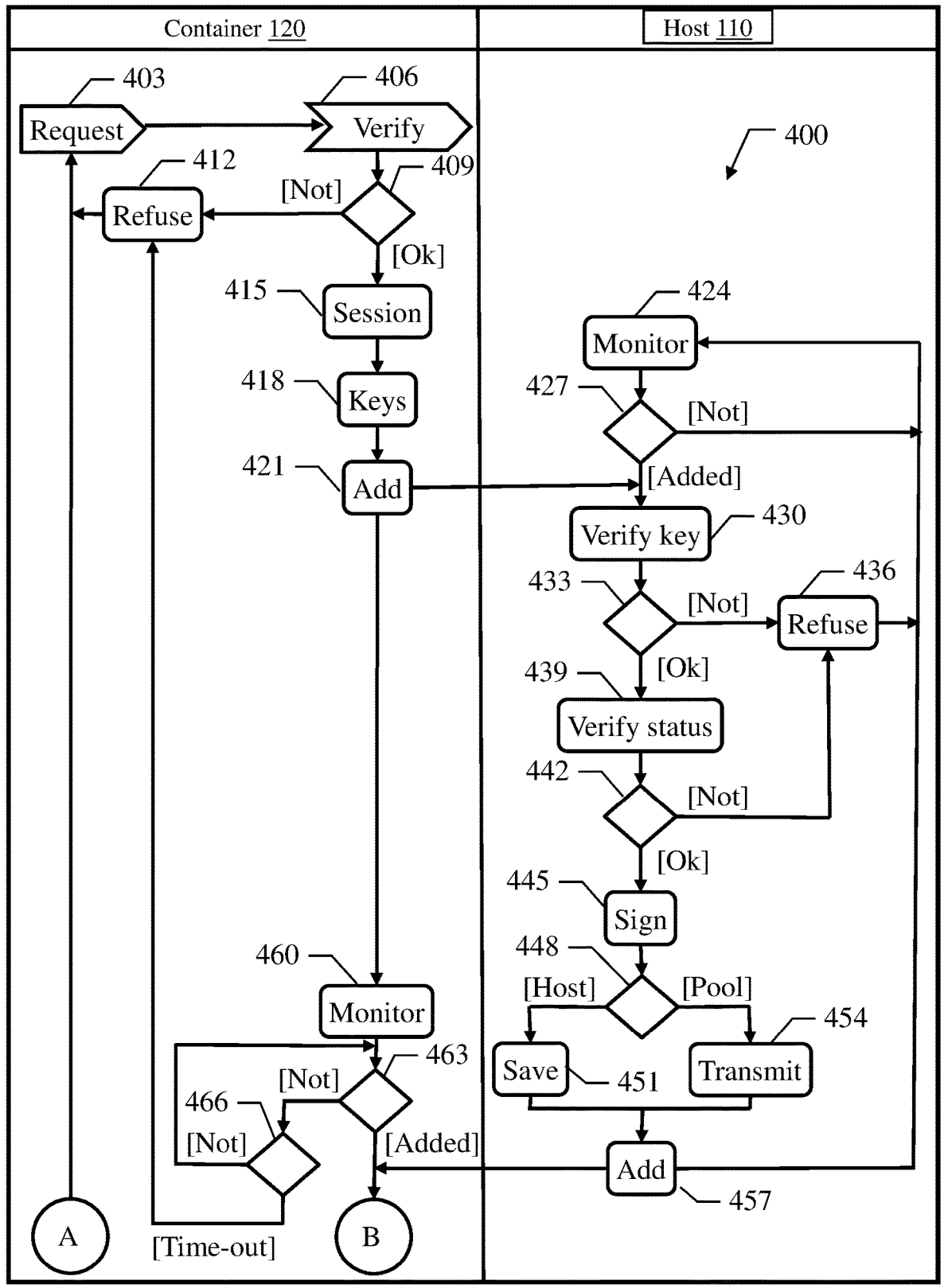
FIG. 4A shows an activity diagram describing the flow of activities relating to an implementation of the solution according to an embodiment of the present disclosure.
Figure 4B:
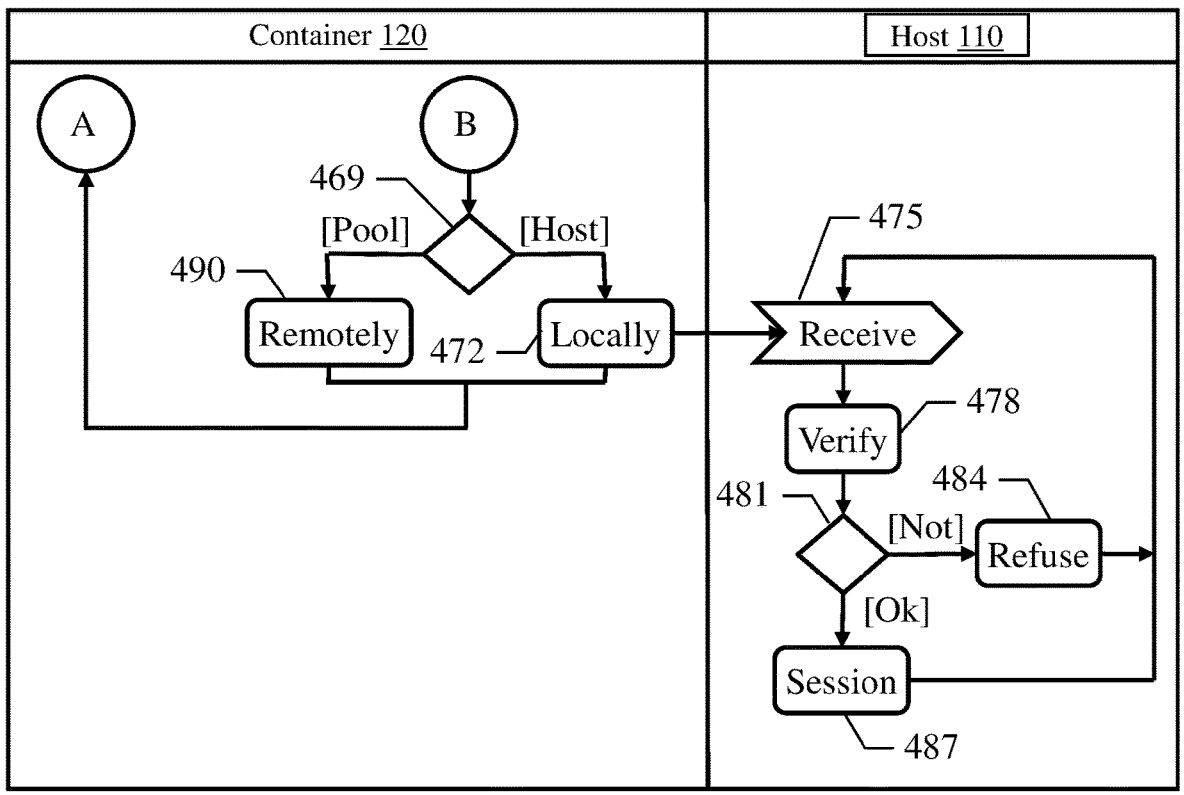
FIG. 4B shows an activity diagram describing the flow of activities relating to an implementation of the solution according to an embodiment of the present disclosure.

With reference now to FIG. 4A-FIG. 4B, an activity diagram is shown describing the flow of activities relating to an implementation of the solution according to an embodiment of the present disclosure.

Particularly, the diagram represents an exemplary process that may be used to control access to the corresponding protected resources by a generic host with a method 400. In this respect, each block may correspond to one or more executable instructions for implementing the specified logical function on the host.

Starting from the swim-lane of the container 120 (secondary environment), the interface of the secondary authorizer (being in a listening condition) at block 403 receives a (new) access request from the client of a generic user for accessing the protected resources. For example, the access request is for accessing the host or each other host of a pool for logging into a shell thereof, executing remote commands, transferring information securely, implementing a tunnel or a VPN, mounting a remote directory into a local file system, performing management, monitoring or maintenance operations, and so on. In response thereto, the secondary authorizer at block 406 verifies the access request as usual. For example, a transport layer of the secondary authorizer authenticates the host to the client (such as via its digital certificate) and exchanges a session key with the client (such as via the Diffie-Hellman key exchange method) to be used for encrypting/decrypting information exchanged during a corresponding communication session (up to a maximum amount thereof or to a maximum time, after which a new session key is exchanged). Moreover, a user authentication layer of the secondary authorizer authenticates the user to the host (such as via his/her public key retrieved from the user repository, by encrypting a problem with the public key, sending the encrypted problem to the client of the user that decrypts it with the corresponding private key and returns the decrypted problem to the host as a proof of his/her identity). The flow of activity branches at block 409 according to a result of the verification of the access request. If the result of the verification is negative (for example, when the user has not been authenticated successfully), the secondary authorizer at block 412 refuses the access request (possibly logging corresponding information and/or sending a warning to a system administrator). The process then returns to the block 403 waiting for a next access request. Conversely, if the result of the verification is positive (meaning that user is authorized to access the protected resources and has been authenticated successfully), the process descends into block 415. At this point, the secondary authorizer grants the access request; however, in this way the user only obtains access to the container and not to the protected resources. For example, a connection layer of the secondary authorizer establishes a (secure) connection between the client of the user and the container, for transferring (encrypted) data in both directions (with a corresponding log-in time of the user to the container that is logged into the user repository). In the solution according to an embodiment of the present disclosure, the secondary authorizer at block 418 now commands the secondary cryptographic engine to generate a pair of private key and public key to be used as (temporary) credentials for authenticating the container to the host on behalf of the user. The secondary authorizer at block 424 creates a new directory for the user in the exchange folder and then saves the private key and the public key just generated therein; this information also defines a result indicator of the positive result of the verification of the access request (for use by the host as described in the following).

With reference instead to the swim-lane of the host 110 (main environment 130), the main monitor at block 424 continually monitors the exchange folder. For example, the main monitor polls the exchange folder directly by actively sampling its content for the addition of directories/files (such as every 1-10 [ms]); alternatively, the main monitor has subscribed to a service of the operating system for receiving notifications of any event involving the addition of directories/files to the exchange folder (such as via the fanotify API). In any case, the flow of activity branches at block 427 according to a result of the monitoring of the exchange folder. If no (new) directory with (new) public key has been added, the process returns to the block 424 to repeat the same operations continually. Conversely, as soon as a (new) directory with a (new) public key has been added (by the secondary authorizer for the user at the block 421), the main authorizer (suitable notified by the monitor) commands the verifier to verify the integrity condition of the container. As a result, the main authorizer detects the positive result of the verification of the access request (performed by the secondary authorizer) without receiving any corresponding request; this adds further security, since it avoids any possibility of main manipulation of the main authorizer. The verification of the integrity condition of the container may be performed by one or more operations. For example, the verifier at block 430 verifies the public key (retrieved from the exchange folder). Particularly, the verifier verifies whether the public key is well-formed (such as whether its format is correct, its matches the corresponding private key and so on). In addition or in alternative, the verifier verifies whether the public key has been created by the expected process; for example, the verifier reads an identifier (such as its Process IDentifier (PID)) of the process that has created the public key (such has from its metadata), and then compares it with a (known) identifier of the secondary authorizer (such as retrieved at the start-up of the host from the container). In addition or in alternative, the verifier verifies a delay between the positive result of the verification of the access request and the storing of the public key; for example, the verifier retrieves the log-in time of the user to the container (from the user repository) and a creation time of the public key (for example, from its metadata), and then compares their difference with a maximum allowable value (such as 0.5-1.5 [s]). In addition or in alternative, the verifier verifies a delay between the storing of the public key and a current time; for example, the verifier retrieves the creation time of the public key (such as from its metadata) and the current time (such as from a system clock), and then compares their difference with a maximum allowable value (such as 0.5-1.5 [s]). The flow of activity branches at block 433 according to a result of the verification of the public key. If the result of the verification of the public key is negative (for example, because at least one of the above-mentioned verifications has failed), this means that the container might have been hacked. In this case, the verification of the integrity condition of the container is negative, and then the authorizer at block 436 refuses the access request (possibly logging corresponding information and/or sending a warning to the system administrator). The process then returns to the block 424 waiting for the addition of a further directory with a further public key to the exchange folder. Conversely, if the result of the verification of the public key is positive, the process descends into block 439 wherein the verifier verifies a status of the container. Particularly, the verifier verifies a content of the memory space of the container; for example, the verifier determines a number of files stored in the memory space of the container and compares it with its expected value (known to the verifier according to the access requests). In addition or in alternative, the verifier verifies the processes running in the container; for example, the verifier determines the number of processes that are running in the container and compares it with its (known) correct number. The flow of activity branches at block 442 according to a result of the verification of the status of the container. If the result of the verification of the status of the container is negative (for example, because at least one of the above-mentioned verifications has failed), this means that the container might have been hacked. Therefore, the verification of the integrity condition of the container is again negative, and the process then passes to the block 436 wherein the authorizer refuses the access request as above (with the process that then returns to the block 424 waiting for the addition of a further directory with a further public key to the exchange folder). Conversely, if the result of the verification of the status of the container is positive, the process descends into block 445. At this point, the verification of the integrity condition of the container is positive (since no suspicious activity has been detected), and the main authorizer then commands the main cryptographic engine to generate a signature of the public key by signing it with its secret key. The signature has a (relatively) fast expiration time (for example, 30-90 [s]). The flow of activity branches at block 448 according to the protected resources to be accessed by the access request (for example, pre-defined or retrieved from the user repository where their indication has been logged by the secondary authorizer). If the protected resources are the same host, the main authorizer at block 451 adds the public key to the corresponding repository (alone or together with its signature). If instead the protected resources are a pool of one or more other hosts, the main authorizer at block 454 transmits the public key and its signature to each other host of the pool. In response thereto (not shown in the figure), in each other host of the pool a similar authorizer (being in a listening condition) receives the public key and its signature; the authorizer likewise adds the public key and its signature to a similar public key repository. The flow of activity merges again at block 457 from either the block 451 or the block 454; at this point, the main authorizer adds the signature to the directory of the user in the exchange folder. The process then returns to the block 424 waiting for the addition of a further directory with a further public key to the exchange folder.

Referring to the swim-lane of the container 120, the process enters a waiting loop for the signature of the public key from the block 421. Particularly, the secondary monitor at block 460 continually monitors the exchange folder. For example, the secondary monitor polls the directory of the user by actively sampling its content for the addition of files (such as every 1-10 ms); alternatively, the secondary monitor has subscribed to the same service of the operating system as above for receiving notifications of any event involving the addition of directories/files to the directory of the user. In any case, the flow of activity branches at block 463 according to a result of the monitoring of the exchange folder. If no (new) signature has been added, the secondary authorizer at block 466 verifies whether a pre-defined time-out has expired from the log-in of the user to the container (retrieved from the user repository), such as 3-5 [s]. If not, the process returns to the block 460 to repeat the same operations continually. Conversely, if the time-out has expired the process again passes to the block 412, wherein the secondary authorizer refuses the access request as above (with the process that then returns to the block 403 waiting for a further access request). Referring back to the block 463, as soon as the signature of the public key has been added (by the main authorizer at the block 457), the process descends into block 469. At this point, the flow of activity branches according to the protected resources to be accessed. If the protected resources are the same host, the secondary authorizer at block 472 submits a (further) access request locally for accessing it to the interface of the main authorizer (on behalf of the user). Moving to the swim-lane of the host 110, the interface of the main authorizer (being in a listening condition) at block 475 receives the access request from the container. In response thereto, the main authorizer at block 478 verifies the access request as above. However, in this case the container is simply authenticated via the public key and its signature. Particularly, the main authorizer at first verifies whether the public key is present in the corresponding repository (having being stored therein in response to the positive verification of the integrity condition of the container). If so, the main authorizer verifies whether the signature has not expired yet; for example, the main authorizer reads the expiration time of the signature (such as from its metadata) and compares it with the current time (such as retrieved from the system clock). If the signature is still valid, the main authorizer calculates a (new) signature of the public key with the secret key of the host and verifies whether it matches the (received) signature. The flow of activity branches at block 481 according to a result of the verification of the access request. If a result of the verification is negative (i.e., the public key is no present in the corresponding repository, the signature has expired or the signature is not correct), the main authorizer at block 484 refuses the access request (possibly logging corresponding information and/or sending a warning to the system administrator). The process then returns to the block 475 waiting for a next access request. Conversely, if the result of the verification is positive (meaning that public key has been actually generated by the main authorizer and signed by it recently), the process descends into block 487. At this point, the main authorizer grants the access request. For example, as above a connection layer of the main authorizer establishes a (secure) connection between the container and the host (on behalf of the user). In this way, the user now actually obtains access to the host, i.e., the desired protected resources, via the container. The process then returns to the block 475 waiting for a next access request from the container. Referring to the swim-lane of the container 120, if the protected resources are the pool of other hosts, the flow of activity passes from the block 469 to block 490; in this case, the secondary authorizer likewise submits a (further) access request remotely for accessing each other host of the pool to a (similar) interface of its authorizer (over the secure LAN). In response thereto (not shown in the figure), in each other host of the pool the interface of the authorizer (being in a listening condition) receives the access request from the container, verifies the access request as above by using the public key and its signature to authenticate the container and then grants the access request (assuming that a result of the verification is positive). For example, as above a connection layer of the authorizer of the other host of the pool establishes a (secure) connection between the container and the other host of the pool (on behalf of the user). In this way, the user now actually obtains access to the hosts of the pool, i.e., the desired protected resources, via the container (which operates as a sort of jump box to access the pool of other hosts). The process then returns from the block 472 or from the block 490 to the block 403 waiting for a next access request.

Naturally, in order to satisfy local and specific requirements, a person skilled in the art may apply many logical and/or physical modifications and alterations to the present disclosure. More specifically, although this disclosure has been described with a certain degree of particularity with reference to one or more embodiments thereof, it should be understood that various omissions, substitutions and changes in the form and details as well as other embodiments are possible. Particularly, different embodiments of the present disclosure may even be practiced without the specific details (such as the numerical values) set forth in the preceding description to provide a more thorough understanding thereof; conversely, well-known features may have been omitted or simplified in order not to obscure the description with unnecessary particulars. Moreover, it is expressly intended that specific elements and/or method steps described in connection with any embodiment of the present disclosure may be incorporated in any other embodiment as a matter of general design choice. Moreover, items presented in a same group and different embodiments, examples or alternatives are not to be construed as de facto equivalent to each other (but they are separate and autonomous entities). In any case, each numerical value should be read as modified according to applicable tolerances; particularly, unless otherwise indicated, the terms "substantially", "about", "approximately" and the like should be understood as within 10%, preferably 5% and still more preferably 1%. Moreover, each range of numerical values should be intended as expressly specifying any possible number along the continuum within the range (comprising its end points). Ordinal or other qualifiers are merely used as labels to distinguish elements with the same name but do not by themselves connote any priority, precedence or order. The terms include, comprise, have, contain, involve and the like should be intended with an open, non-exhaustive meaning (i.e., not limited to the recited items), the terms based on, dependent on, according to, function of and the like should be intended as a non-exclusive relationship (i.e., with possible further variables involved), the term a/an should be intended as one or more items (unless expressly indicated otherwise), and the term means for (or any means-plus-function formulation) should be intended as any structure adapted or configured for carrying out the relevant function.

For example, an embodiment provides a method for controlling access to one or more computing resources. However, the computing resources may be in any number and of any type (for example, partial, different and additional computing resources with respect to the ones mentioned above, either individually or in any combination thereof, provided by the same computing system or by one or more other computing systems, and so on), and they may be accessed for any purpose (for example, to operate on hosts, to run applications, to read/write data and so on).

In an embodiment, the method comprises the following steps under the control of a computing system. However, the computing system may be of any type (see below).

In an embodiment, the method comprises receiving an access request for accessing the computing resources by a secondary computing environment implemented in the computing system. However, the secondary computing environment may be of any type (for example, a container, a virtual machine and so on) and it may receive the access request in any way (for example, with a message, a command and the like, submitted by any subjects, such as users, programs, services and the like).

In an embodiment, the secondary computing environment is isolated from the computing resources. However, this result may be achieved in any way (for example, logically when the computing resources are provided by the same computing system, physically when the computing resources are provided by different computing systems and so on).

In an embodiment, the method comprises verifying the access request by the secondary computing environment. However, the access request may be verified in any way (for example, by authenticating the subject submitting it in any way, such as with a private key, a password, a token and the like, by further verifying a corresponding entitlement, such as based on roles, attributes and the like, and so on).

In an embodiment, the method comprises detecting an indication of a positive result of said verifying the access request by a main computing environment implemented in the computing system. However, the main computing environment may be of any type (for example, the whole computing environment defined by an operating system of the computing system, a separate virtual machine and so on) and it may detect the positive result in any way (for example, by monitoring an exchange memory area, inquiring the secondary computing environment and so on).

In an embodiment, the main computing environment is isolated from the secondary computing environment. However, this result may be achieved in any way (for example, by an operating system, a virtualization layer and so on).

In an embodiment, the method comprises verifying an integrity condition of the secondary computing environment by the main computing environment in response to said detecting the indication of the positive result. However, the integrity condition may be verified in any way (for example, by verifying the result indicator and/or the status of the secondary computing environment, with partial, different and additional verifications with respect to the ones mentioned above, either individually or in any combination thereof).

In an embodiment, the method comprises authorizing said accessing the computing resources to the secondary computing environment by the main computing environment in response to a positive result of said verifying the integrity condition. However, the access request may be authorized in any way (for example, by generating credentials for use by the secondary computing environment to submit a corresponding further access request to the main computing environment, by automatically granting the access to the secondary computing environment and so on).

Further embodiments provide additional advantageous features, which may however be omitted at all in a basic implementation.

Particularly, in an embodiment the main computing environment is defined by an operating system of the computing system. However, the operating system may be of any type (for example, of single-user, multi-users and the like type, with a command-line interface, a graphical user interface and so on).

In an embodiment, the secondary computing environment is defined by a container running on the operating system. However, the container may be of any type (for example, with a fully-dedicated information image, with an information image formed by a read-only layer from which multiple containers are instantiated and a read-write layer dedicated to the container with a redirect-on-write technique, and so on).

In an embodiment, said step of authorizing said accessing the computing resources comprises generating credentials by the main computing environment in response to the positive result of said verifying the integrity condition. However, the credentials may be of any type (for example, a signature, a one-time password and so on).

In an embodiment, said step of authorizing said accessing the computing resources comprises passing the credentials from the main computing environment to the secondary computing environment. However, the credentials may be passed in any way (for example, by storing them into an exchange memory area, by sending a message and so on).

In an embodiment, said step of authorizing said accessing the computing resources comprises submitting a further access request for accessing the computing resources by the secondary computing environment to the main computing environment in response to the credentials. However, the further access request may be submitted in any way (for example, automatically, manually in a very limited shell provided by the secondary processing environment and so on).

In an embodiment, said step of authorizing said accessing the computing resources comprises verifying the further access request by the main computing environment according to the credentials provided by the secondary computing environment. However, the further access request may be verified in any way (for example, by verifying that the signature is correct, by comparing the one-time password with its expected value and so on).

In an embodiment, said step of authorizing said accessing the computing resources comprises authorizing said accessing the computing resources to the secondary computing environment by the main computing environment in response to a positive result of said verifying the further access request. However, the access to the computing resources may be authorized in any way (see above).

In an embodiment, the method comprises storing a result indicator into an exchange memory area by the secondary computing environment in response to the positive result of said verifying the access request. However, the result indicator may be of any type (for example, a fresh public key, a one-time password, an identifier of the subject requesting the access and so on) and it may be stored in any exchange memory area (for example, a shared folder with directories dedicated to the access requests, a shared memory structure with entries dedicated to the access requests and so on).

In an embodiment, the method comprises detecting the indication of the positive result by detecting said storing the result indicator by the main computing environment. However, the storing of the result indicator may be detected in any way (for example, by monitoring the exchange memory area, by subscribing to a corresponding notification service and so on).

In an embodiment, the method comprises generating a pair of public key and private key by the secondary computing environment in response to the positive result of said verifying the access request. However, the public/private keys may be generated in any way (for example, based on any cryptographic algorithm, with any format and so on).

In an embodiment, the method comprises storing the result indicator comprising the public key into the exchange memory area by the secondary computing environment. However, the result indicator may be based on the public key in any way (for example, together with the corresponding private key, stand-alone and so on).

In an embodiment, said step of verifying the integrity condition comprises verifying a formal correction of the public key by the main computing environment. However, the formal correction of the public key may be verified in any way (for example, according to its format, its matching with the private key and so on).

In an embodiment, said step of authorizing said accessing the computing resources comprises generating a signature of the result indicator with a secret key thereof by the main computing environment in response to said detecting said storing the result indicator. However, the secret key may be of any type (for example, a private key, a symmetric key and so on).

In an embodiment, said step of authorizing said accessing the computing resources comprises storing the signature into the exchange memory area by the main computing environment. However, the signature may be stored into the exchange memory area in any way (for example, in the same directory of the access request in the shared folder, in another shared folder with directories dedicated to the access requests, in the same entry of the access request in the shared memory structure, in another shared memory structure with entries dedicated to the access requests and so on).

In an embodiment, said step of authorizing said accessing the computing resources comprises detecting said storing the signature by the secondary computing environment. However, the storing of the signature may be detected in any way (for example, by monitoring the exchange memory area, by subscribing to a corresponding notification service and so on).

In an embodiment, said step of authorizing said accessing the computing resources comprises submitting a further access request for accessing the computing resources by the secondary computing environment to the main computing environment in response to said detecting said storing the signature. However, the further access request may be submitted in any way (see above).

In an embodiment, said step of authorizing said accessing the computing resources comprises verifying the further access request by the main computing environment according to the signature provided by the secondary computing environment. However, the further access request may be verified according to the signature in any way (for example, by regenerating the signature and comparing it with the received one, by comparing the received signature with its correct value being saved previously and so on).

In an embodiment, said step of authorizing said accessing the computing resources comprises generating the signature having an expiration time by the main computing environment in response to said detecting said storing the result indicator. However, the expiration time may be of any type (for example, with any value, defined by any indication thereof, such as expiration time alone, signature time and signature duration, and the like, embedded in the signature, stored in the main computing environment and so on).

In an embodiment, said step of authorizing said accessing the computing resources comprises verifying the further access request by the main computing environment according to the expiration time of the signature provided by the secondary computing environment. However, the expiration time may be used in any way (for example, by simply comparing the expiration time with a current time, by tolerating a certain delay in case of a high workload and so on).

In an embodiment, said step of verifying the integrity condition comprises verifying an identifier of a process generating the result indicator by the main computing environment. However, this verification may be performed in any way (for example, by reading metadata of the result indicator, by inquiring the operating system and so on).

In an embodiment, said step of verifying the integrity condition comprises verifying a delay between the positive result of said verifying the access request and said storing the result indicator by the main computing environment. However, the delay may be used to verify the integrity condition in any way (for example, by simply comparing the delay with any maximum allowable value, by tolerating a certain extra-delay in case of a high workload and so on).

In an embodiment, said step of verifying the integrity condition comprises verifying a delay between said storing the result indicator and a current time by the main computing environment. However, this further delay may be used to verify the integrity condition in any way (for example, by simply comparing the delay with any maximum allowable value, by tolerating a certain extra-delay in case of a high workload and so on).

In an embodiment, said step of verifying the integrity condition comprises verifying a content of a memory space of the secondary computing environment by the main computing environment. However, the content of the memory space may be verified in any way (for example, according to the number of files, the names of the files, the creators of the files and so on).

In an embodiment, said step of verifying the integrity condition comprises verifying processes running in the secondary computing environment by the main computing environment. However, the processes may be verified in any way (for example, according to their number, type, identifiers, parents and so on).

In an embodiment, the computing resources are implemented by the computing system. However, the computing resources may be implemented by the computing system in any way (for example, given by the whole computing system, an application running therein, information stored therein and so on).

In an embodiment, the computing resources are implemented by one or more further computing systems. However, the further computing systems may be in any number, of any type (for example, hosts, servers, virtual machines and so on) and coupled with the computing system in any way (for example, communicating among them via any local, wide area, global, cellular or satellite network and exploiting any type of wired and/or wireless connections); moreover, the computing resources may be implemented by the further computing systems in any way (for example, given by the whole further computing systems, applications running therein, information stored therein, any combination thereof and so on).

Generally, similar considerations apply if the same solution is implemented with an equivalent method (by using similar steps with the same functions of more steps or portions thereof, removing some non-essential steps or adding further optional steps); moreover, the steps may be performed in a different order, concurrently or in an interleaved way (at least in part).

An embodiment provides a computer program that is configured for causing a computing system to perform the above-mentioned method. An embodiment provides a computer program product, which comprises one or more computer readable storage media having program instructions collectively stored in said one or more computer readable storage media, the program instructions readable by a computing system to cause the computing system to perform the same method. However, the computer program may be implemented as a stand-alone module, as a plug-in for a pre-existing software application (for example, an access control application) or directly therein. Moreover, the computer program may be executed on any computing system (see below). In any case, the solution according to an embodiment of the present disclosure lends itself to be implemented even with a hardware structure (for example, by electronic circuits integrated in one or more chips of semiconductor material), or with a combination of software and hardware suitably programmed or otherwise configured.

An embodiment provides a system comprising means that are configured for performing the steps of the above-described method. An embodiment provides a system comprising a circuit (i.e., any hardware suitably configured, for example, by software) for performing each step of the above-described method. However, the system may be of any type (for example, a physical machine, a virtual machine, a pool of physical/virtual machines and so on) and it may interact with any number and type of clients requesting access to the computing resources (for example, over any network, such as of global, local, cellular or satellite type exploiting any type of wired and/or wireless connections, or even locally, and so on).

Generally, similar considerations apply if the system has a different structure or comprises equivalent components or it has other operative characteristics. In any case, every component thereof may be separated into more elements, or two or more components may be combined together into a single element; moreover, each component may be replicated to support the execution of the corresponding operations in parallel. Moreover, unless specified otherwise, any interaction between different components generally does not need to be continuous, and it may be either direct or indirect through one or more intermediaries. Regarding the flowcharts and block diagrams, the flowchart and block diagrams in the Figures of the present disclosure illustrate the architecture, functionality, and operation of possible implementations of systems, methods, and computer program products according to various embodiments of the present invention. In this regard, each block in the flowchart or block diagrams may represent a module, segment, or portion of instructions, which comprises one or more executable instructions for implementing the specified logical function(s). In some alternative implementations, the functions noted in the blocks may occur out of the order noted in the Figures. For example, two blocks shown in succession may, in fact, be executed substantially concurrently, or the blocks may sometimes be executed in the reverse order, depending upon the functionality involved. It will also be noted that each block of the block diagrams and/or flowchart illustration, and combinations of blocks in the block diagrams and/or flowchart illustration, can be implemented by special purpose hardware-based systems that perform the specified functions or acts or carry out combinations of special purpose hardware and computer instructions.

Figure 5:
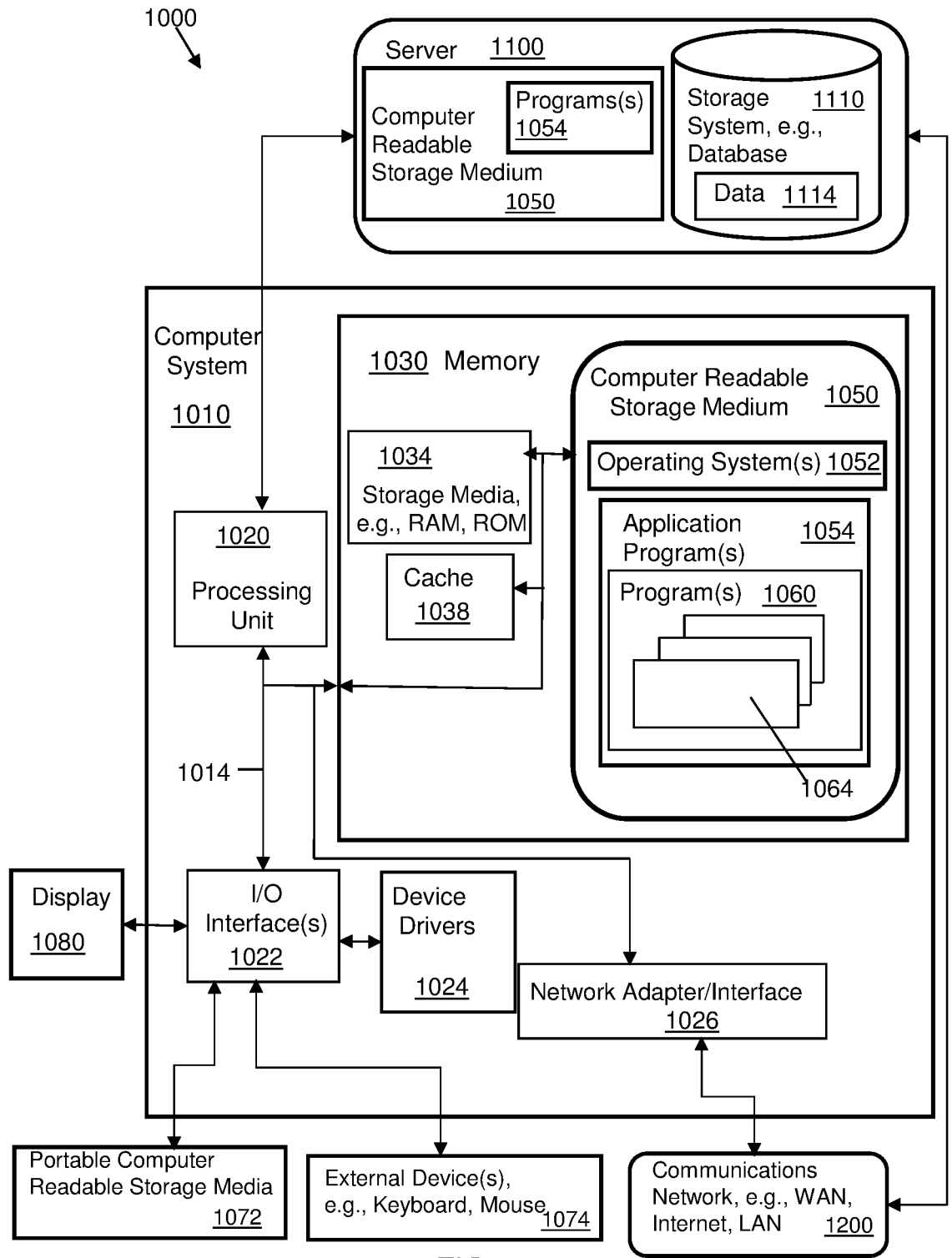
FIG. 5 is a schematic block diagram depicting a computer system according to an embodiment of the disclosure which may be incorporated, all or in part, in one or more computers or devices shown in FIG. 1, and cooperates with the systems and methods shown in FIG. 1.

Referring to FIG. 5, a system or computer environment 1000 includes a computer diagram 1010 shown in the form of a generic computing device. The method of the invention, for example, may be embodied in a program 1060, including program instructions, embodied on a computer readable storage device, or computer readable storage medium, for example, generally referred to as memory 1030 and more specifically, computer readable storage medium 1050. Such memory and/or computer readable storage media includes non-volatile memory or non-volatile storage. For example, memory 1030 can include storage media 1034 such as RAM (Random Access Memory) or ROM (Read Only Memory), and cache memory 1038. The program 1060 is executable by the processor 1020 of the computer system 1010 (to execute program steps, code, or program code). Additional data storage may also be embodied as a database 1110 which includes data 1114. The computer system 1010 and the program 1060 are generic representations of a computer and program that may be local to a user, or provided as a remote service (for example, as a cloud based service), and may be provided in further examples, using a web site accessible using the communications network 1200 (e.g., interacting with a network, the Internet, or cloud services). It is understood that the computer system 1010 also generically represents herein a computer device or a computer included in a device, such as a laptop or desktop computer, etc., or one or more servers, alone or as part of a datacenter. The computer system can include a network adapter/interface 1026, and an input/output (I/O) interface(s) 1022. The I/O interface 1022 allows for input and output of data with an external device 1074 that may be connected to the computer system. The network adapter/interface 1026 may provide communications between the computer system a network generically shown as the communications network 1200.

The computer 1010 may be described in the general context of computer system-executable instructions, such as program modules, being executed by a computer system. Generally, program modules may include routines, programs, objects, components, logic, data structures, and so on that perform particular tasks or implement particular abstract data types. The method steps and system components and techniques may be embodied in modules of the program 1060 for performing the tasks of each of the steps of the method and system. The modules are generically represented in the figure as program modules 1064. The program 1060 and program modules 1064 can execute specific steps, routines, sub-routines, instructions or code, of the program.

The method of the present disclosure can be run locally on a device such as a mobile device, or can be run a service, for instance, on the server 1100 which may be remote and can be accessed using the communications network 1200. The program or executable instructions may also be offered as a service by a provider. The computer 1010 may be practiced in a distributed cloud computing environment where tasks are performed by remote processing devices that are linked through a communications network 1200. In a distributed cloud computing environment, program modules may be located in both local and remote computer system storage media including memory storage devices.

The computer 1010 can include a variety of computer readable media. Such media may be any available media that is accessible by the computer 1010 (e.g., computer system, or server), and can include both volatile and non-volatile media, as well as removable and non-removable media. Computer memory 1030 can include additional computer readable media in the form of volatile memory, such as random access memory (RAM) 1034, and/or cache memory 1038. The computer 1010 may further include other removable/non-removable, volatile/non-volatile computer storage media, in one example, portable computer readable storage media 1072. In one embodiment, the computer readable storage medium 1050 can be provided for reading from and writing to a non-removable, non-volatile magnetic media. The computer readable storage medium 1050 can be embodied, for example, as a hard drive. Additional memory and data storage can be provided, for example, as the storage system 1110 (e.g., a database) for storing data 1114 and communicating with the processing unit 1020. The database can be stored on or be part of a server 1100. Although not shown, a magnetic disk drive for reading from and writing to a removable, non-volatile magnetic disk (e.g., a "floppy disk"), and an optical disk drive for reading from or writing to a removable, non-volatile optical disk such as a CD-ROM, DVD-ROM or other optical media can be provided. In such instances, each can be connected to bus 1014 by one or more data media interfaces. As will be further depicted and described below, memory 1030 may include at least one program product which can include one or more program modules that are configured to carry out the functions of embodiments of the present invention.

The method(s) described in the present disclosure, for example, may be embodied in one or more computer programs, generically referred to as a program 1060 and can be stored in memory 1030 in the computer readable storage medium 1050. The program 1060 can include program modules 1064. The program modules 1064 can generally carry out functions and/or methodologies of embodiments of the invention as described herein. The one or more programs 1060 are stored in memory 1030 and are executable by the processing unit 1020. By way of example, the memory 1030 may store an operating system 1052, one or more application programs 1054, other program modules, and program data on the computer readable storage medium 1050. It is understood that the program 1060, and the operating system 1052 and the application program(s) 1054 stored on the computer readable storage medium 1050 are similarly executable by the processing unit 1020. It is also understood that the application 1054 and program(s) 1060 are shown generically, and can include all of, or be part of, one or more applications and program discussed in the present disclosure, or vice versa, that is, the application 1054 and program 1060 can be all or part of one or more applications or programs which are discussed in the present disclosure.

One or more programs can be stored in one or more computer readable storage media such that a program is embodied and/or encoded in a computer readable storage medium. In one example, the stored program can include program instructions for execution by a processor, or a computer system having a processor, to perform a method or cause the computer system to perform one or more functions.

The computer 1010 may also communicate with one or more external devices 1074 such as a keyboard, a pointing device, a display 1080, etc.; one or more devices that enable a user to interact with the computer 1010; and/or any devices (e.g., network card, modem, etc.) that enables the computer 1010 to communicate with one or more other computing devices. Such communication can occur via the Input/Output (I/O) interfaces 1022. Still yet, the computer 1010 can communicate with one or more networks 1200 such as a local area network (LAN), a general wide area network (WAN), and/or a public network (e.g., the Internet) via network adapter/interface 1026. As depicted, network adapter 1026 communicates with the other components of the computer 1010 via bus 1014. It should be understood that although not shown, other hardware and/or software components could be used in conjunction with the computer 1010. Examples, include, but are not limited to: microcode, device drivers 1024, redundant processing units, external disk drive arrays, RAID systems, tape drives, and data archival storage systems, etc.

It is understood that a computer or a program running on the computer 1010 may communicate with a server, embodied as the server 1100, via one or more communications networks, embodied as the communications network 1200. The communications network 1200 may include transmission media and network links which include, for example, wireless, wired, or optical fiber, and routers, firewalls, switches, and gateway computers. The communications network may include connections, such as wire, wireless communication links, or fiber optic cables. A communications network may represent a worldwide collection of networks and gateways, such as the Internet, that use various protocols to communicate with one another, such as Lightweight Directory Access Protocol (LDAP), Transport Control Protocol/Internet Protocol (TCP/IP), Hypertext Transport Protocol (HTTP), Wireless Application Protocol (WAP), etc. A network may also include a number of different types of networks, such as, for example, an intranet, a local area network (LAN), or a wide area network (WAN).

In one example, a computer can use a network which may access a website on the Web (World Wide Web) using the Internet. In one embodiment, a computer 1010, including a mobile device, can use a communications system or network 1200 which can include the Internet, or a public switched telephone network (PSTN) for example, a cellular network. The PSTN may include telephone lines, fiber optic cables, transmission links, cellular networks, and communications satellites. The Internet may facilitate numerous searching and texting techniques, for example, using a cell phone or laptop computer to send queries to search engines via text messages (SMS), Multimedia Messaging Service (MMS) (related to SMS), email, or a web browser. The search engine can retrieve search results, that is, links to web sites, documents, or other downloadable data that correspond to the query, and similarly, provide the search results to the user via the device as, for example, a web page of search results.

The present invention may be a system, a method, and/or a computer program product at any possible technical detail level of integration. The computer program product may include a computer readable storage medium (or media) having computer readable program instructions thereon for causing a processor to carry out aspects of the present invention. The computer readable storage medium can be a tangible device that can retain and store instructions for use by an instruction execution device. The computer readable storage medium may be, for example, but is not limited to, an electronic storage device, a magnetic storage device, an optical storage device, an electromagnetic storage device, a semiconductor storage device, or any suitable combination of the foregoing. A non-exhaustive list of more specific examples of the computer readable storage medium includes the following: a portable computer diskette, a hard disk, a random access memory (RAM), a read-only memory (ROM), an erasable programmable read-only memory (EPROM or Flash memory), a static random access memory (SRAM), a portable compact disc read-only memory (CD-ROM), a digital versatile disk (DVD), a memory stick, a floppy disk, a mechanically encoded device such as punch-cards or raised structures in a groove having instructions recorded thereon, and any suitable combination of the foregoing. A computer readable storage medium, as used herein, is not to be construed as being transitory signals per se, such as radio waves or other freely propagating electromagnetic waves, electromagnetic waves propagating through a waveguide or other transmission media (e.g., light pulses passing through a fiber-optic cable), or electrical signals transmitted through a wire. Computer readable program instructions described herein can be downloaded to respective computing/processing devices from a computer readable storage medium or to an external computer or external storage device via a network, for example, the Internet, a local area network, a wide area network and/or a wireless network. The network may comprise copper transmission cables, optical transmission fibers, wireless transmission, routers, firewalls, switches, gateway computers and/or edge servers. A network adapter card or network interface in each computing/processing device receives computer readable program instructions from the network and forwards the computer readable program instructions for storage in a computer readable storage medium within the respective computing/processing device. Computer readable program instructions for carrying out operations of the present invention may be assembler instructions, instruction-set-architecture (ISA) instructions, machine instructions, machine dependent instructions, microcode, firmware instructions, state-setting data, configuration data for integrated circuitry, or either source code or object code written in any combination of one or more programming languages, including an object oriented programming language such as Smalltalk, C++, or the like, and procedural programming languages, such as the "C" programming language or similar programming languages. The computer readable program instructions may execute entirely on the user's computer, partly on the user's computer, as a stand-alone software package, partly on the user's computer and partly on a remote computer or entirely on the remote computer or server. In the latter scenario, the remote computer may be connected to the user's computer through any type of network, including a local area network (LAN) or a wide area network (WAN), or the connection may be made to an external computer (for example, through the Internet using an Internet Service Provider). In some embodiments, electronic circuitry including, for example, programmable logic circuitry, field-programmable gate arrays (FPGA), or programmable logic arrays (PLA) may execute the computer readable program instructions by utilizing state information of the computer readable program instructions to personalize the electronic circuitry, in order to perform aspects of the present invention. Aspects of the present invention are described herein with reference to flowchart illustrations and/or block diagrams of methods, apparatus (systems), and computer program products according to embodiments of the invention. It will be understood that each block of the flowchart illustrations and/or block diagrams, and combinations of blocks in the flowchart illustrations and/or block diagrams, can be implemented by computer readable program instructions.

These computer readable program instructions may be provided to a processor of a general-purpose computer, special purpose computer, or other programmable data processing apparatus to produce a machine, such that the instructions, which execute via the processor of the computer or other programmable data processing apparatus, create means for implementing the functions/acts specified in the flowchart and/or block diagram block or blocks. These computer readable program instructions may also be stored in a computer readable storage medium that can direct a computer, a programmable data processing apparatus, and/or other devices to function in a particular manner, such that the computer readable storage medium having instructions stored therein comprises an article of manufacture including instructions which implement aspects of the function/act specified in the flowchart and/or block diagram block or blocks.

The computer readable program instructions may also be loaded onto a computer, other programmable data processing apparatus, or other device to cause a series of operational steps to be performed on the computer, other programmable apparatus or other device to produce a computer implemented process, such that the instructions which execute on the computer, other programmable apparatus, or other device implement the functions/acts specified in the flowchart and/or block diagram block or blocks.

The flowchart and block diagrams in the Figures illustrate the architecture, functionality, and operation of possible implementations of systems, methods, and computer program products according to various embodiments of the present invention. In this regard, each block in the flowchart or block diagrams may represent a module, segment, or portion of instructions, which comprises one or more executable instructions for implementing the specified logical function(s). In some alternative implementations, the functions noted in the blocks may occur out of the order noted in the Figures. For example, two blocks shown in succession may, in fact, be executed substantially concurrently, or the blocks may sometimes be executed in the reverse order, depending upon the functionality involved. It will also be noted that each block of the block diagrams and/or flowchart illustration, and combinations of blocks in the block diagrams and/or flowchart illustration, can be implemented by special purpose hardware-based systems that perform the specified functions or acts or carry out combinations of special purpose hardware and computer instructions.

It is to be understood that although this disclosure includes a detailed description on cloud computing, implementation of the teachings recited herein are not limited to a cloud computing environment. Rather, embodiments of the present invention are capable of being implemented in conjunction with any other type of computing environment now known or later developed.

Cloud computing is a model of service delivery for enabling convenient, on-demand network access to a shared pool of configurable computing resources (e.g., networks, network bandwidth, servers, processing, memory, storage, applications, virtual machines, and services) that can be rapidly provisioned and released with minimal management effort or interaction with a provider of the service. This cloud model may include at least five characteristics, at least three service models, and at least four deployment models.

Characteristics are as follows:

On-demand self-service: a cloud consumer can unilaterally provision computing capabilities, such as server time and network storage, as needed automatically without requiring human interaction with the service's provider.

Broad network access: capabilities are available over a network and accessed through standard mechanisms that promote use by heterogeneous thin or thick client platforms (e.g., mobile phones, laptops, and PDAs).

Resource pooling: the provider's computing resources are pooled to serve multiple consumers using a multi-tenant model, with different physical and virtual resources dynamically assigned and reassigned according to demand. There is a sense of location independence in that the consumer generally has no control or knowledge over the exact location of the provided resources but may be able to specify location at a higher level of abstraction (e.g., country, state, or datacenter).

Rapid elasticity: capabilities can be rapidly and elastically provisioned, in some cases automatically, to quickly scale out and rapidly released to quickly scale in. To the consumer, the capabilities available for provisioning often appear to be unlimited and can be purchased in any quantity at any time.

Measured service: cloud systems automatically control and optimize resource use by leveraging a metering capability at some level of abstraction appropriate to the type of service (e.g., storage, processing, bandwidth, and active user accounts). Resource usage can be monitored, controlled, and reported, providing transparency for both the provider and consumer of the utilized service.

Service Models are as follows:

Software as a Service (SaaS): the capability provided to the consumer is to use the provider's applications running on a cloud infrastructure. The applications are accessible from various client devices through a thin client interface such as a web browser (e.g., web-based e-mail). The consumer does not manage or control the underlying cloud infrastructure including network, servers, operating systems, storage, or even individual application capabilities, with the possible exception of limited user-specific application configuration settings.

Platform as a Service (PaaS): the capability provided to the consumer is to deploy onto the cloud infrastructure consumer-created or acquired applications created using programming languages and tools supported by the provider. The consumer does not manage or control the underlying cloud infrastructure including networks, servers, operating systems, or storage, but has control over the deployed applications and possibly application hosting environment configurations.

Infrastructure as a Service (IaaS): the capability provided to the consumer is to provision processing, storage, networks, and other fundamental computing resources where the consumer is able to deploy and run arbitrary software, which can include operating systems and applications. The consumer does not manage or control the underlying cloud infrastructure but has control over operating systems, storage, deployed applications, and possibly limited control of select networking components (e.g., host firewalls).

Deployment Models are as follows:

Private cloud: the cloud infrastructure is operated solely for an organization. It may be managed by the organization or a third party and may exist on-premises or off-premises.

Community cloud: the cloud infrastructure is shared by several organizations and supports a specific community that has shared concerns (e.g., mission, security requirements, policy, and compliance considerations). It may be managed by the organizations or a third party and may exist on-premises or off-premises.

Public cloud: the cloud infrastructure is made available to the general public or a large industry group and is owned by an organization selling cloud services.

Hybrid cloud: the cloud infrastructure is a composition of two or more clouds (private, community, or public) that remain unique entities but are bound together by standardized or proprietary technology that enables data and application portability (e.g., cloud bursting for load-balancing between clouds).

A cloud computing environment is service oriented with a focus on statelessness, low coupling, modularity, and semantic interoperability. At the heart of cloud computing is an infrastructure that includes a network of interconnected nodes.

Figure 6:
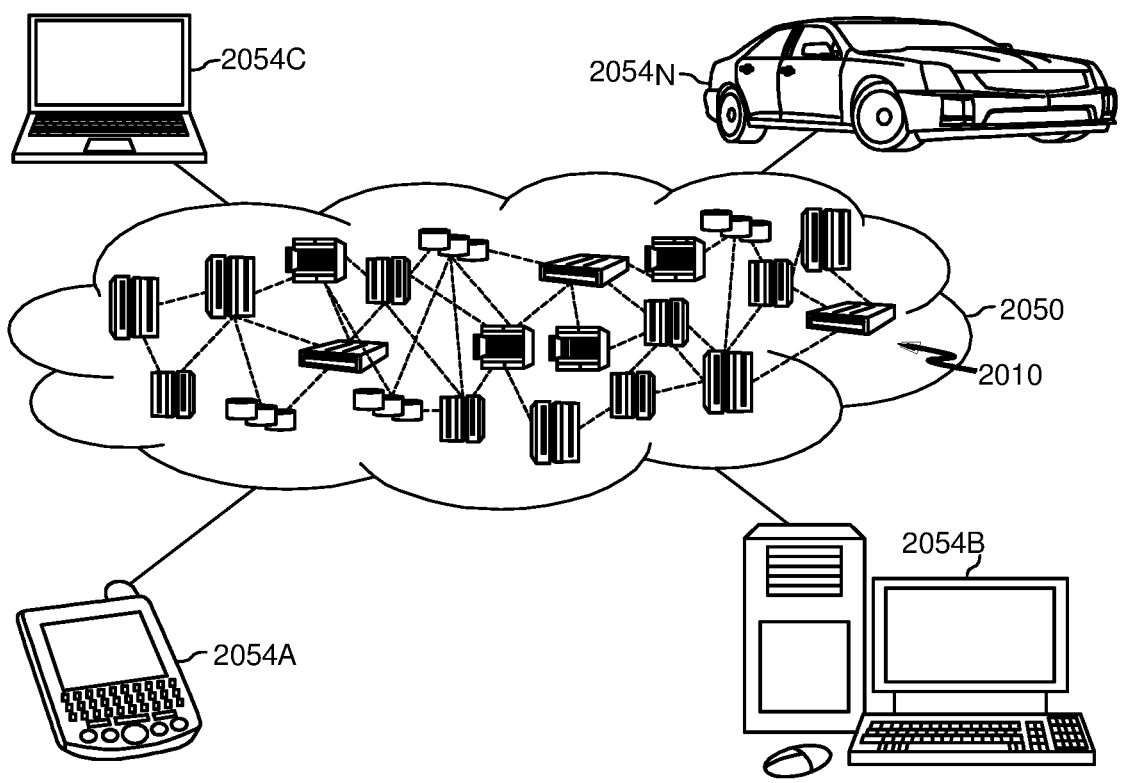
FIG. 6 depicts a cloud computing environment according to an embodiment of the present invention.

Referring now to FIG. 6, illustrative cloud computing environment 2050 is depicted. As shown, cloud computing environment 2050 includes one or more cloud computing nodes 2010 with which local computing devices used by cloud consumers, such as, for example, personal digital assistant (PDA) or cellular telephone 2054A, desktop computer 2054B, laptop computer 2054C, and/or automobile computer system 2054N may communicate. Nodes 2010 may communicate with one another. They may be grouped (not shown) physically or virtually, in one or more networks, such as Private, Community, Public, or Hybrid clouds as described hereinabove, or a combination thereof. This allows cloud computing environment 2050 to offer infrastructure, platforms and/or software as services for which a cloud consumer does not need to maintain resources on a local computing device. It is understood that the types of computing devices 2054A-N shown in FIG. 9 are intended to be illustrative only and that computing nodes 2010 and cloud computing environment 2050 can communicate with any type of computerized device over any type of network and/or network addressable connection (e.g., using a web browser).

Figure 7:
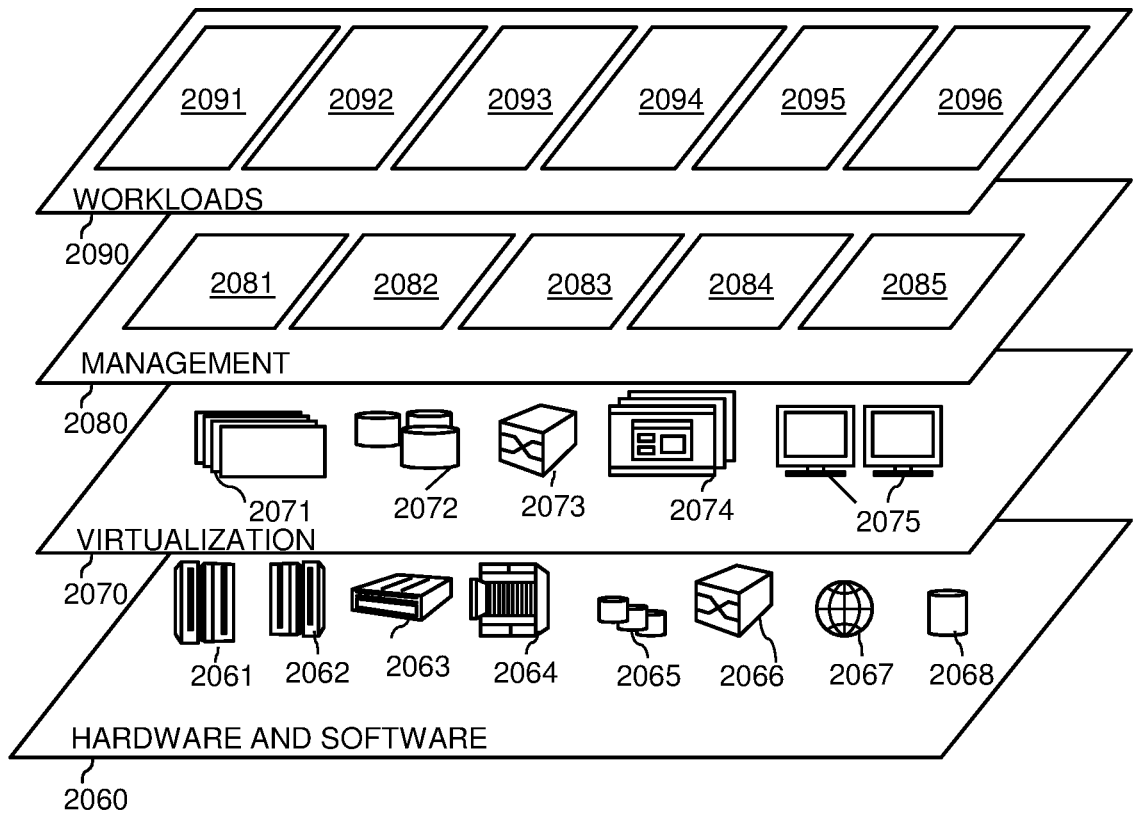
FIG. 7 depicts abstraction model layers according to an embodiment of the present invention.

Referring now to FIG. 7, a set of functional abstraction layers provided by cloud computing environment 2050 (FIG. 6) is shown. It should be understood in advance that the components, layers, and functions shown in FIG. 7 are intended to be illustrative only and embodiments of the invention are not limited thereto. As depicted, the following layers and corresponding functions are provided:

Hardware and software layer 2060 includes hardware and software components. Examples of hardware components include: mainframes 2061; RISC (Reduced Instruction Set Computer) architecture based servers 2062; servers 2063; blade servers 2064; storage devices 2065; and networks and networking components 2066. In some embodiments, software components include network application server software 2067 and database software 2068.

Virtualization layer 2070 provides an abstraction layer from which the following examples of virtual entities may be provided: virtual servers 2071; virtual storage 2072; virtual networks 2073, including virtual private networks; virtual applications and operating systems 2074; and virtual clients 2075.

In one example, management layer 2080 may provide the functions described below. Resource provisioning 2081 provides dynamic procurement of computing resources and other resources that are utilized to perform tasks within the cloud computing environment. Metering and Pricing 2082 provide cost tracking as resources are utilized within the cloud computing environment, and billing or invoicing for consumption of these resources. In one example, these resources may include application software licenses. Security provides identity verification for cloud consumers and tasks, as well as protection for data and other resources. User portal 2083 provides access to the cloud computing environment for consumers and system administrators. Service level management 2084 provides cloud computing resource allocation and management such that required service levels are met. Service Level Agreement (SLA) planning and fulfillment 2085 provide pre-arrangement for, and procurement of, cloud computing resources for which a future requirement is anticipated in accordance with an SLA.

Workloads layer 2090 provides examples of functionality for which the cloud computing environment may be utilized. Examples of workloads and functions which may be provided from this layer include: mapping and navigation 2091; software development and lifecycle management 2092; virtual classroom education delivery 2093; data analytics processing 2094; transaction processing 2095; and controlling access to one or more computing resources 2096.

The descriptions of the various embodiments of the present invention have been presented for purposes of illustration, but are not intended to be exhaustive or limited to the embodiments disclosed. Likewise, examples of features or functionality of the embodiments of the disclosure described herein, whether used in the description of a particular embodiment, or listed as examples, are not intended to limit the embodiments of the disclosure described herein, or limit the disclosure to the examples described herein. Many modifications and variations will be apparent to those of ordinary skill in the art without departing from the scope and spirit of the described embodiments. The terminology used herein was chosen to best explain the principles of the embodiments, the practical application or technical improvement over technologies found in the marketplace, or to enable others of ordinary skill in the art to understand the embodiments disclosed herein.

What is claimed is:

1. A method for controlling access to one or more computing resources, wherein the method comprises, under control of a computing system:
receiving an access request for accessing the computing resources of a main computing environment by a secondary computing environment implemented in the computing system hosting both the main computing environment and the secondary computing environment, the secondary computing environment being isolated from the computing resources, and the main computing environment being isolated from the secondary computing environment;
verifying the access request by the secondary computing environment;
monitoring an exchange folder of the secondary computing environment by the main computing environment, the exchange folder being accessible to the main computing environment via an operating system of the computing system;
detecting an indication of a positive result of said verifying the access request by the monitoring of the exchange folder by the main computing environment;
verifying an integrity condition of the secondary computing environment by the main computing environment in response to said detecting the indication of the positive result;
authorizing said accessing the computing resources to the secondary computing environment by the main computing environment in response to a positive result of said verifying the integrity condition;
generating a public key and a private key by the secondary computing environment, in response to verifying the access request;
storing the verification including the public key into an exchange memory area by the secondary computing environment; and
signing the public key using a secret key of the main computing environment, in response to detecting the verification by the main computing environment, wherein the main computing environment is defined by the operating system of the computing system and the secondary computing environment is defined by a container running on the operating system, wherein the container emulates a computing environment running on the operating system.

2. The method according to claim 1, wherein said authorizing said accessing the computing resources comprises:
generating credentials by the main computing environment in response to the positive result of said verifying the integrity condition;
passing the credentials from the main computing environment to the secondary computing environment;
submitting a further access request for accessing the computing resources by the secondary computing environment to the main computing environment in response to the credentials;
verifying the further access request by the main computing environment according to the credentials provided by the secondary computing environment; and
authorizing said accessing the computing resources to the secondary computing environment by the main computing environment in response to a positive result of said verifying the further access request.

3. The method according to claim 1, wherein the method comprises:
storing a result indicator into an exchange memory area by the secondary computing environment in response to the positive result of said verifying the access request; and
detecting the indication of the positive result by detecting said storing the result indicator by the main computing environment.

4. The method according to claim 3, wherein the method comprises:
generating a pair of public key and private key by the secondary computing environment in response to the positive result of said verifying the access request; and
storing the result indicator comprising the public key into the exchange memory area by the secondary computing environment.

5. The method according to claim 4, wherein said verifying the integrity condition comprises:
verifying a formal correction of the public key by the main computing environment.

6. The method according to claim 3, wherein said authorizing said accessing the computing resources comprises:
generating a signature of the result indicator with a secret key thereof by the main computing environment in response to said detecting said storing the result indicator;
storing the signature into the exchange memory area by the main computing environment;
detecting said storing the signature by the secondary computing environment;
submitting a further access request for accessing the computing resources by the secondary computing environment to the main computing environment in response to said detecting said storing the signature;
verifying the further access request by the main computing environment according to the signature provided by the secondary computing environment; and
authorizing said accessing the computing resources to the secondary computing environment by the main computing environment in response to a positive result of said verifying the further access request.

7. The method according to claim 6, wherein said authorizing said accessing the computing resources comprises:
generating the signature having an expiration time by the main computing environment in response to said detecting said storing the result indicator; and
verifying the further access request by the main computing environment according to the expiration time of the signature provided by the secondary computing environment.

8. The method according to claim 3, wherein said verifying the integrity condition comprises:
verifying an identifier of a process generating the result indicator by the main computing environment.

9. The method according to claim 3, wherein said verifying the integrity condition comprises:
verifying a delay between the positive result of said verifying the access request and said storing the result indicator by the main computing environment.

10. The method according to claim 3, wherein said verifying the integrity condition comprises:
verifying a delay between said storing the result indicator and a current time by the main computing environment.

11. The method according to claim 1, wherein said verifying the integrity condition comprises:
verifying a content of a memory space of the secondary computing environment by the main computing environment.

12. The method according to claim 1, wherein said verifying the integrity condition comprises:
verifying processes running in the secondary computing environment by the main computing environment.

13. The method according to claim 1, wherein the computing resources are implemented by the computing system.

14. The method according to claim 1, wherein the computing resources are implemented by one or more further computing systems.

15. A computer program product for controlling access to one or more computing resources, the computer program product comprising one or more computer readable storage media having program instructions collectively stored in said one or more computer readable storage media, the program instructions readable by a computing system to cause the computing system to perform a method comprising:
receiving, using the computer, an access request for accessing the computing resources of a main computing environment by a secondary computing environment implemented in the computing system hosting both the main computing environment and the secondary computing environment, the secondary computing environment being isolated from the computing resources, and the main computing environment being isolated from the secondary computing environment;
verifying, using the computer, the access request by the secondary computing environment;
monitoring an exchange folder of the secondary computing environment by the main computing environment, the exchange folder being accessible to the main computing environment via an operating system of the computing system;
detecting, using the computer, an indication of a positive result of said verifying the access request by the monitoring of the exchange folder by the main computing environment;
verifying, using the computer, an integrity condition of the secondary computing environment by the main computing environment in response to said detecting the indication of the positive result;
authorizing, using the computer, said accessing the computing resources to the secondary computing environment by the main computing environment in response to a positive result of said verifying the integrity condition;
generating a public key and a private key by the secondary computing environment, in response to verifying the access request;
storing the verification including the public key into an exchange memory area by the secondary computing environment; and
signing the public key using a secret key of the main computing environment, in response to detecting the verification by the main computing environment, wherein the main computing environment is defined by the operating system of the computing system and the secondary computing environment is defined by a container running on the operating system, wherein the container emulates a computing environment running on the operating system.

16. A computing system for controlling access to one or more computing resources, wherein the system comprises:
a computer readable storage media;
a secondary computing environment implemented in the computing system, the secondary computing environment being isolated from the computing resources, wherein the secondary computing environment comprises:
an interface for receiving an access request for accessing the computing resources of a main computing environment by a secondary computing environment implemented in the computing system hosting both the main computing environment and the secondary computing environment, the secondary computing environment being isolated from the computing resources, and the main computing environment being isolated from the secondary computing environment;
an exchange folder of the secondary computing environment being monitored by the main computing environment, the exchange folder being accessible to the main computing environment via an operating system of the computing system; a secondary authorizer for verifying the access request; and the main computing environment comprises: a monitor for detecting an indication of a positive result of said verifying the access request; a verifier for verifying an integrity condition of the secondary computing environment in response to said detecting the indication of the positive result; a main authorizer for authorizing said accessing the computing resources to the secondary computing environment in response to a positive result of said verifying the integrity condition; generating a public key and a private key by the secondary computing environment, in response to verifying the access request; storing the verification including the public key into an exchange memory area by the secondary computing environment; and signing the public key using a secret key of the main computing environment, in response to detecting the verification by the main computing environment, wherein the main computing environment is defined by the operating system of the computing system and the secondary computing environment is defined by a container running on the operating system, wherein the container emulates a computing environment running on the operating system.

\* \* \* \* \*